United States Patent [19]

Lowe

[11] Patent Number: 5,372,676
[45] Date of Patent: Dec. 13, 1994

[54] METHOD FOR PRODUCING REPLICATED PAVING STONE

[76] Inventor: Michael Lowe, 2634 Firestone Dr., Clearwater, Pinellas County, Fla. 34621

[21] Appl. No.: 231,028

[22] Filed: Apr. 22, 1994

Related U.S. Application Data

[63] Continuation-in-part of Ser. No. 84,081, Jun. 28, 1993, abandoned, which is a continuation of Ser. No. 700,623, May 15, 1991, abandoned.

[51] Int. Cl.⁵ .............................. B28B 1/08; B28B 7/36; B28B 11/00; B44C 1/22
[52] U.S. Cl. .................................... 156/654; 156/645; 264/71; 264/74; 264/133; 264/162; 264/163; 264/232; 264/233; 264/245; 264/313; 264/338; 264/340; 427/393.6; 428/15; 428/703
[58] Field of Search ...................... 264/69-72, 264/333, 131, 133, 139, 162, 163, DIG. 43, 73, 74, 233, 313, 232, 340, 338, 245; 428/15, 49, 904.4, 688, 703; 156/61, 655, 654, 645; 106/715; 52/311, 314, 316; 427/393.6

[56] References Cited

U.S. PATENT DOCUMENTS

| | | | |
|---|---|---|---|
| 716,371 | 12/1902 | Black et al. | 428/15 |
| 1,681,727 | 8/1928 | Emerson | 264/333 X |
| 2,047,426 | 7/1936 | Miller | 264/DIG. 43 X |
| 2,819,495 | 1/1958 | Krausz | 264/256 X |
| 3,058,164 | 10/1962 | Rowe | 428/15 |
| 3,426,122 | 2/1969 | Gaudelli et al. | 264/336 X |
| 3,621,086 | 11/1971 | Gulde | 264/71 |
| 3,795,721 | 3/1974 | Gilbert et al. | 428/49 |
| 3,939,238 | 2/1976 | Salts | 264/71 |
| 4,043,826 | 8/1977 | Hum | 264/333 X |
| 4,349,588 | 9/1982 | Schiffer | |
| 4,769,191 | 9/1988 | Diana | 264/69 X |
| 4,868,018 | 9/1989 | Schiffer | 428/15 |
| 4,895,598 | 1/1990 | Hedberg | 106/694 |
| 5,167,991 | 12/1992 | Lowe | |

FOREIGN PATENT DOCUMENTS

| | | | |
|---|---|---|---|
| 3601041 | 7/1987 | Germany | 264/71 |
| 3813851 | 11/1989 | Germany | 264/69 |
| 86/03433 | 6/1986 | WIPO | |

Primary Examiner—Karen Aftergut
Attorney, Agent, or Firm—Arthur W. Fisher, III

[57] ABSTRACT

A method of producing replicated paving stone including a base having a shaded and stratified layered upper surface with a plurality of simulated grout lines formed therein including the steps of preparing a cementitious mortar, applying a release agent to the interior of a forming mold, pouring the cementitious mortar into the forming mold, leveling the mortar, vibrating the forming mold and cementitious mortar therein, allowing the cementitious mortar to cure forming a base with an upper surface, releasing the base from the forming mold, applying an acid stain to the base, allowing the acid stain to etch the base to shade the upper surface, accenting the plurality of simulated grout lines with a pigment and sealing the replicated paving stone with an acrylic polymer sealer.

3 Claims, 6 Drawing Sheets

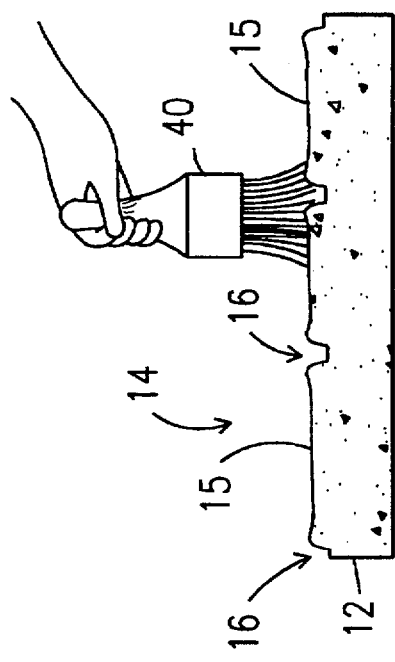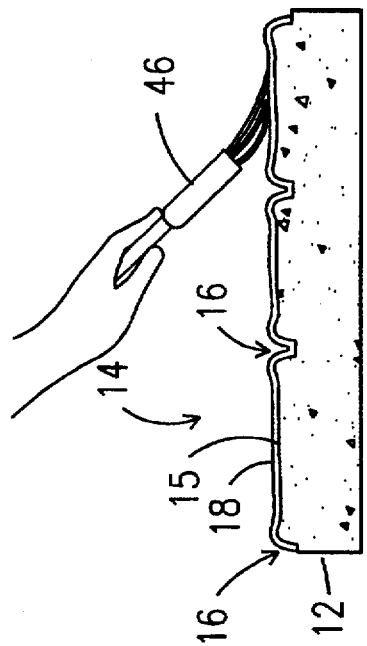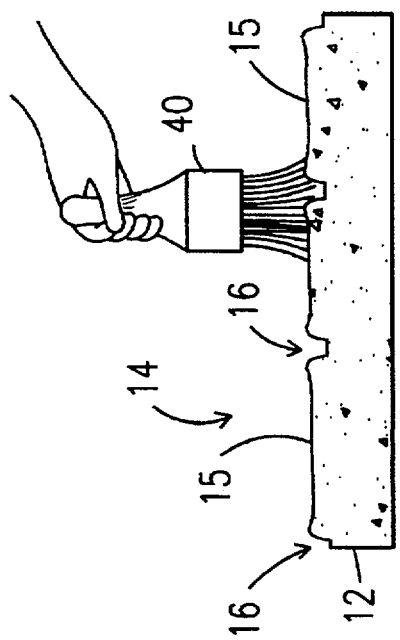

METHOD FOR PRODUCING REPLICATED PAVING STONE

CO-PENDING APPLICATION

This application is a continuation-in-part application of co-pending application Ser. NO. 08/084,081, filed Jun. 28, 1993, which is a continuation application of Ser. No. 700,623, filed May 15, 1991, now abandoned.

BACKGROUND OF THE INVENTION

1. Field of the Invention

A method for producing the replicated stone surface.

2. Description of the Prior Art

The high cost of labor and material have made the use of genuine brick, stone and tile in construction prohibitively expensive.

As a result relatively inexpensive polymers and concrete have become popular in the manufacture of artificial brick, stone and tile. Artificial brick surfaces are relatively easy to produce. However the production of aesthetically appealing artificial stone is more difficult. Specifically, replicating the texture resembling real stone and the color is often poor.

U.S. Pat. No. 4,310,370 shows a process for producing decorative articles comprising the steps of placing into mutual contact and laminating a hardenable decorative material layer and an expansion-contraction deformable sheet provided with regions susceptible to expansion-contraction deformation and regions not susceptible to deformation; causing the deformable sheet to undergo deformation under pressure to impart a pattern of unevennesses to the decorative material layer in contact with the sheet; and causing the hardenable decorative material layer to fully harden. The sheet deformed under pressure imparts a pattern of surface unevenness corresponding to the two kinds of regions to the decorative material layer. The degree of surface unevenness can be controlled by adjusting the pressure. Colored patterns corresponding to the unevennesses can also be formed.

U.S. Pat. No. 3,836,619 describes a method of forming an artificial stone comprising the steps of providing a flexible mold; pouring a curable mixture of polyester plastic and catalyst in the mold to form a polyester plastic body having a configured surface; scraping off excess of the curable mixture by applying sufficient pressure to depress the edges of the mold and form a raised lip on the plastic body; curing the mixture; removing the plastic body from the mold; spraying the configured surface with a liquid color layer and drying; spraying the color layer with a curable, transparent, liquid coat and curing said coat until the outer surface is gelled; spraying a thin layer of sand on the outer surface of said transparent coat, and curing the transparent coat, thereby bonding the sand layer to the transparent coat layer.

U.S. Pat. No. 4,349,588 teaches a method for producing simulated brick, tile wall or floor using cement, water-based adhesive and water insoluble powdered pigment. The mixture is applied and then partially set. Scoring indentations are made to remove cement. After being completely set, mortar is placed in the indentations as a grout and allowed to set. The final step is a clear water-resistant coating on the entire surface.

U.S. Pat. No. 4,126,727 shows a resinous polymer sheet material having selective, decorative effects comprising a first layer of a resinous polymer composition; a pattern or design printed on and adhered to the surface of the first layer of resinous polymer composition and having relatively dark colored printed portions and relatively light colored printed portions. A second layer of a resinous polymer composition is applied on and adhered to the printed pattern or design and to the first layer of resinous polymer composition. The second layer of resinous polymer composition includes a layer of relatively small, flat, decorative chips or flakes comprising a very thin layer of translucent or transparent platelets provided with coating. Light wave interference and color absorptive effects are created as light waves strike and reflect from the second layer of resinous polymer composition whereby the decorative chips or flakes located over the relatively dark colored printed portions are discernible from eye-level or a distance of about five feet whereas those decorative chips or flakes located over the relatively light colored printed portions are indiscernible from eye-level or a distance of about five feet.

U.S. Pat. No. 4,105,816 describes a decorative relief finished surface formed to a substrate by applying an undercoat material to a predetermined thickness and forming an uneven pattern with a rolling device having a plurality of convex parts of curved continued, disconnected to perforated line shape. Then, the top portions of the projections of the partially hardened surface which extend beyond a predetermined height are pressed with a pressing roll such that the projections are uniformly flattened to a predetermined thickness while the rest of the convex parts are left unflattened.

U.S. Pat. No. 3,882,218 shows embossed decorative patterns and decorative laminates, particularly textured film finished structural elements and the method of manufacture wherein a resilient material such as a wadding sheet or pad sheet is interposed between the surface film and the substrate.

U.S. Pat. No. 3,152,002 describes a process of making elastomeric flooring of varigated color comprising the steps of coating a sheet of backing material with a liquid polyvinyl chloride plastisol, delivering a charge of solid unheated plastic granules of polyvinyl chloride compound and different colors to the coated backing sheet, spreading the granules in a layer of substantially uniform thickness in the liquid plastisol, partially curing the plastisol to fix the position of the granules on the backing sheet and then molding the components into a product of the desired surface texture.

U.S. Pat. No. 3,012,285 teaches a process of producing an elastomeric covering for floors, walls and the like comprising the steps of mixing a plurality of moldable vinyl elastomers of different shades of the same base color, calendering the mixture to form a solid mottled sheet of the selected colors, heating the calendered elastomeric sheet to molding temperature, molding the overall surface area of the sheet by applying a mold having a plurality of scattered low protuberances of irregular outline and of varying size, depth, configuration and distribution, removing the mold from the molded sheet, coating the molded surface of the elastomeric sheet with a paint of a color contrasting with the base color and then removing the colored paint immediately to expose plane surface areas of the molded elastomeric sheet while leaving the depressed areas of the cavities thereof permanently coated with the contrasting colored paint.

U.S. Pat. No. 2,577,241 shows a method of producing a face configuration of variable pattern which comprises impressing in the face of deformable material a textured surface element having a definite face pattern to thereby provide the deformable material with a face presenting a complete pattern complemental to the pattern of the element and then impressing on the deformable material face to a less depth a textured surface element in random relation to the complemental pattern to randomly modify the pattern of said material face while maintaining the general texture resulting from the first impression.

Additional examples of the prior art are found in U.S. Pat. Nos. 2,955,324; 3,839,514 and U.S. Pat. No. 3,848,043.

SUMMARY OF THE INVENTION

The present invention relates to a replicated paving stone such as slate and the method for producing the replicated paving stone. As described more fully hereinafter, the method produces the replicated paving stone comprising a shaded and stratified layered upper surface including a plurality of simulated grout lines formed therein.

The replicated paving stone comprises a base of cementitious mortar or material including a shaded and stratified layered upper surface having a plurality of simulated grout lines formed therein. The shaded and stratified layered upper surface and simulated grout lines are sealed to protect the replicated paving stone from the environment.

The method for producing the replicated paving stone comprise the steps of preparing a cementitious mortar, applying a hydrophobic release agent to the interior of a flexible block forming mold, pouring the cementitious mortar into the flexible block forming mold, leveling the mortar in the flexible block forming mold, vibrating the flexible block forming mold and cementitious mortar, allowing the cementitious mortar to cure to form the base including the stratified layered upper surface and plurality of simulated grout lines, releasing the base including the stratified layered upper surface and plurality of simulated grout lines from the flexible block forming mold, applying an acid stain to the stratified layered upper surface, allowing the acid stain to etch the stratified layered upper surface to shade the stratified layered upper surface, washing the shaded and stratified layered upper surface with an acid, accenting the plurality of simulated grout lines with a pigment and sealing the replicated paving stone with an acrylic polymer sealer.

To produce the cementitious mortar or material; commercial grade sand, Portland cement, small aggregate, surfactant or wetting agent, water, and non-chloride accelerator are introduced into a mixer and thoroughly mixed to produce a homogeneous cementitious mortar or material.

A dry granular hydrophobic release agent is applied to the interior of a flexible block forming mold to prevent the cementitious mortar or material from adhering to the flexible block forming mold.

The homogeneous cementitious mortar is then poured into the flexible block forming mold and leveled with a trowel or other suitable means.

The cementitious mortar or material and flexible block forming mold are vibrated causing the fines or smaller sand and aggregate particles to migrate to the bottom. The cementitious mortar or material is then cured and removed from the flexible block forming mold.

An acid stain is applied to the upper surface of the base and set to shade the upper surface. The stained or shaded upper surface is then washed with an acid by the use of a nozzle or other suitable means.

The simulated grout lines are accented with an antiquing or iron oxide pigment with a brush or other suitable means.

Finally, the shaded and stratified layered upper surface and simulated grout lines are coated with a sealer with a brush or roller to protect the replicated paving stone. Once the sealer hardens, the replicated paving stone is ready for traffic.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIGS. 6 through 13 show the individual steps of the method for producing the replicated paving stone.

Similar reference characters refer to similar parts throughout the several views of the drawings.

DETAILED DESCRIPTION OF THE PREFERRED EMBODIMENT

Figure 1:
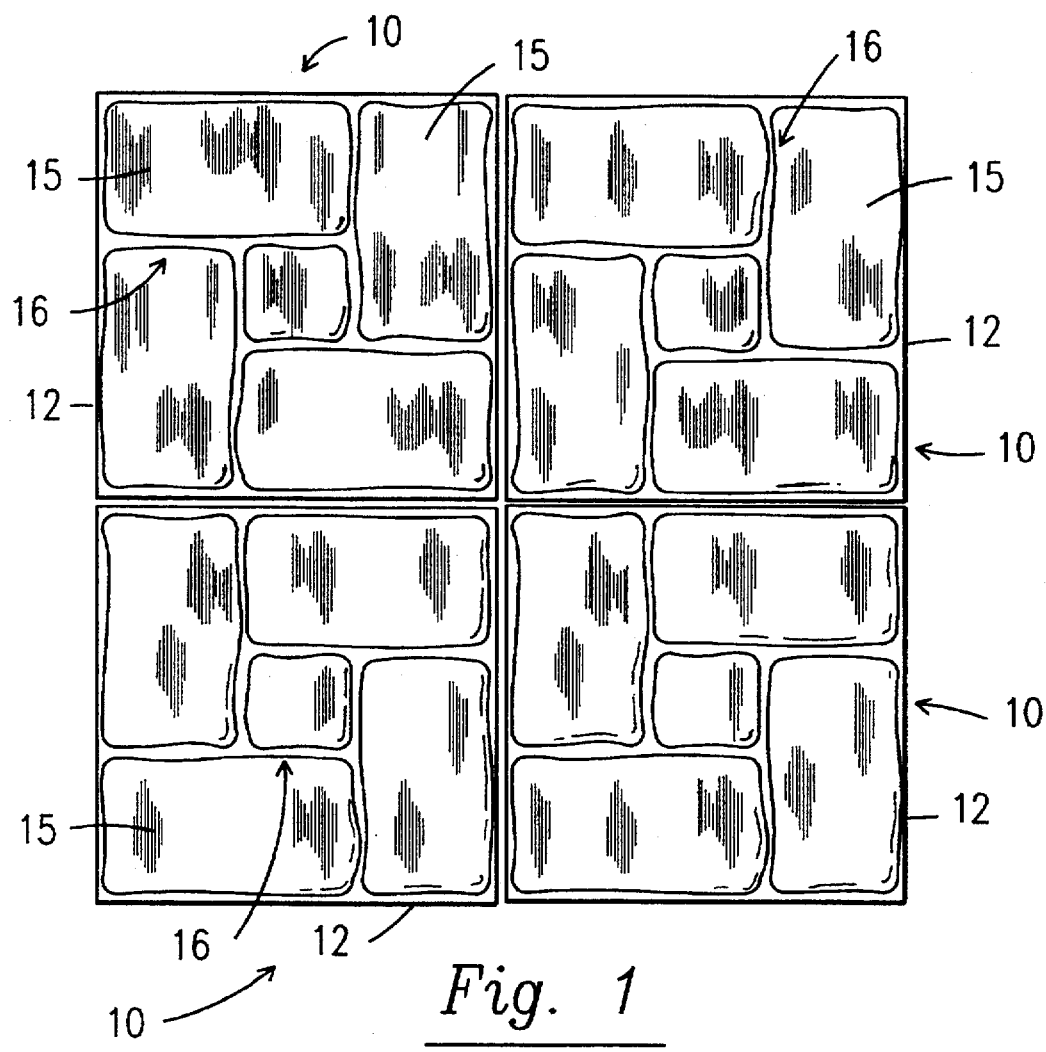
FIG. 1 is a top view of a plurality of replicated paving stones.
Figure 2:
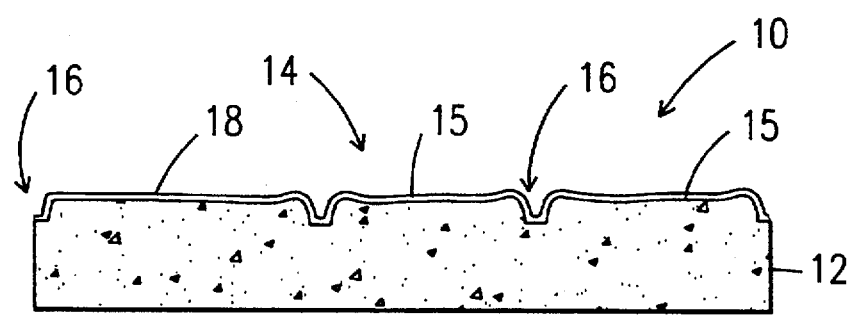
FIG. 2 is a cross-sectional view of the replicated paving stone.

As best shown in FIGS. 1 and 2, the present invention relates to a replicated paving stone such as slate generally indicated as 10 and the method for producing the replicated paving stone 10. As described more fully hereinafter, the method produces the replicated paving stone 10 comprising a shaded and stratified layered upper surface including a plurality of simulated grout lines formed therein.

As best shown in FIGS. 1 and 2, the replicated paving stone 10 comprises a base 12 of cementitious mortar or material including a shaded and stratified layered upper surface generally indicated as 14 having individual stone elements each indicated as 15 and the plurality of simulated grout lines each indicated as 16 formed therein. The shaded and stratified layered upper surface 14 and simulated grout lines 16 are sealed with a clear acrylic thermal plastic water resistant sealer 18 to protect the replicated paving stone 10 from the environment.

Figure 3:
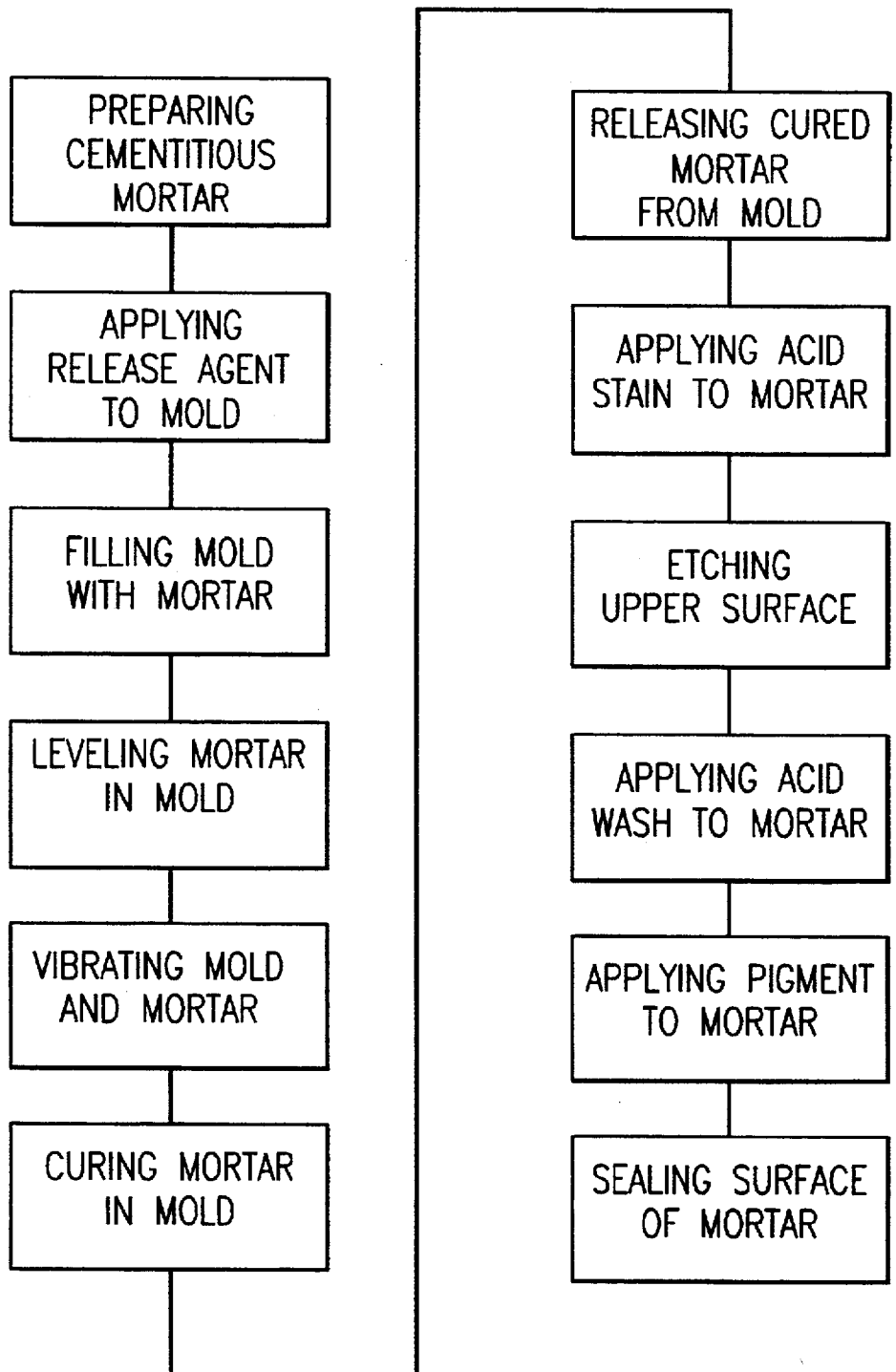
FIG. 3 is a flow chart of the steps of the method for producing the replicated paving stone.

FIG. 3 is a flow chart of the method for producing the replicated paving stone 10 comprising the steps of preparing a cementitious mortar, applying a hydrophobic release agent to the interior of a flexible block forming mold, pouring the cementitious mortar into the flexible block forming mold, leveling the mortar in the flexible block forming mold, vibrating the flexible block forming mold and cementitious mortar, allowing the cementitious mortar to cure to form the base including the stratified layered upper surface and plurality of simulated grout lines, releasing the base including the stratified layered upper surface and plurality of simulated grout lines from the flexible block forming mold, applying an acid stain to the stratified layered upper surface, allowing the acid stain to etch the stratified layered upper surface to shade the stratified layered upper surface, washing the shaded and stratified layered upper surface with an acid, accenting the plurality of simulated grout lines with a pigment and sealing the replicated paving stone with an acrylic polymer sealer.

Figure 4:
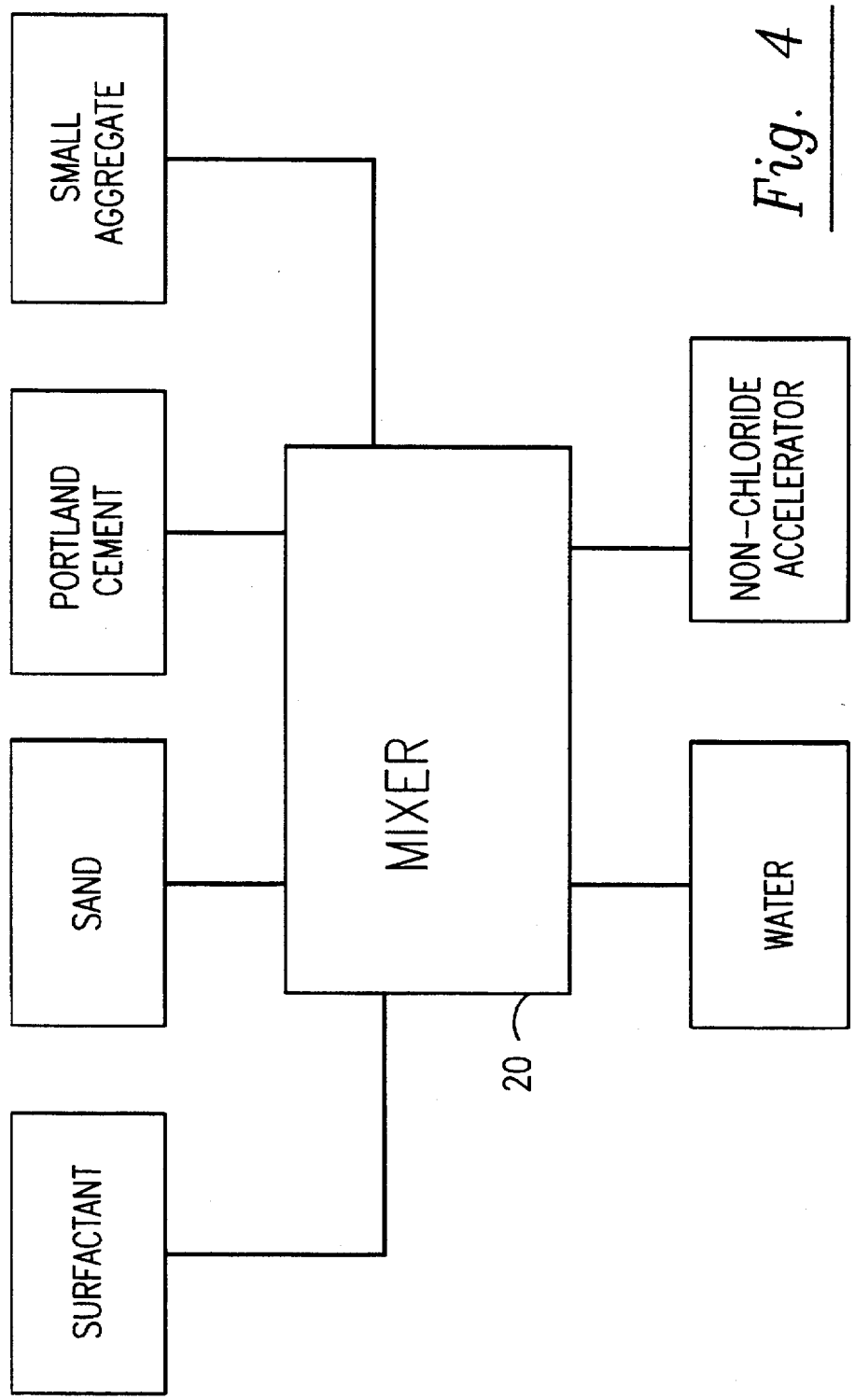
FIG. 4 is a schematic diagram of the steps of preparing the cementitious mortar used in the production of the replicated paving block.

FIG. 4 is a schematic diagram depicting the preparation of the cementitious mortar. To produce a yard of the cementitious mortar or material; 1,150 pounds of commercial grade sand, 640 pounds of Portland cement, 1,600 pounds of ⅜ inch to ½ inch small aggregate, 45 ounces of surfactant or wetting agent, 36 gallons of water, and 20 ounces to 60 ounces of non-chloride accelerator per hundred weight of Portland cement are introduced into a mixer 20 and thoroughly mixed to produce a homogeneous cementitious mortar or material.

Figure 5:
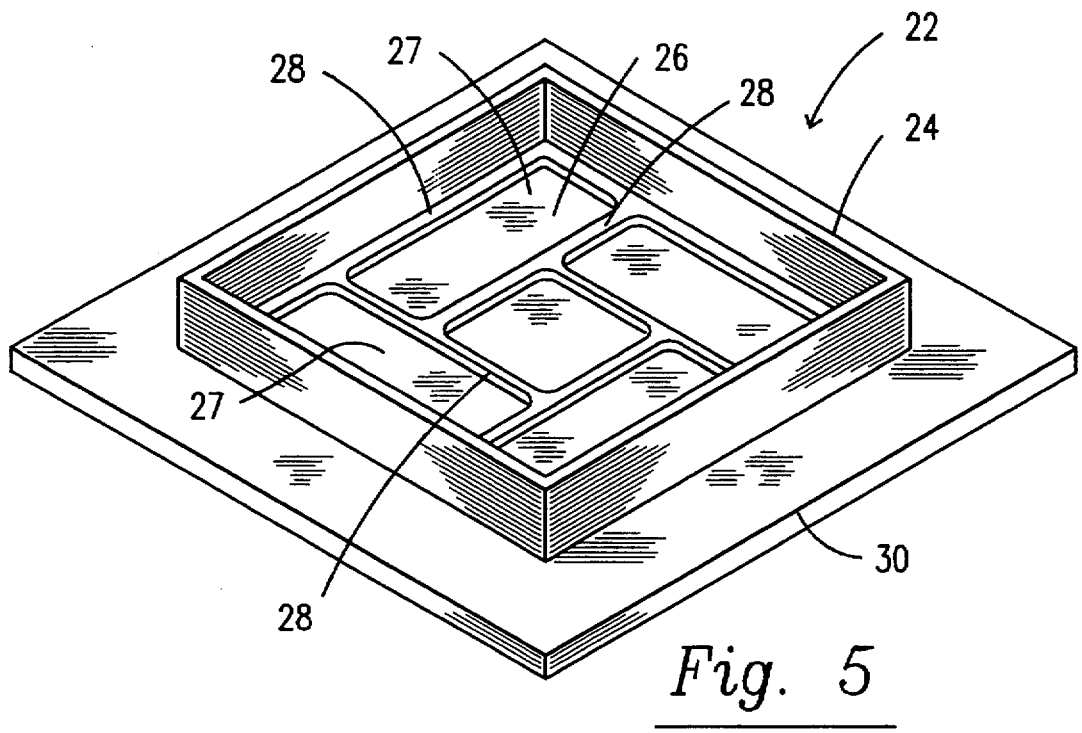
FIG. 5 shows a perspective view of the flexible block forming mold.

As shown in FIG. 5, the interior of the flexible block forming mold generally indicated as 22 comprises an outer peripheral wall 24 and contoured or irregular bottom 26 having a plurality of recesses each indicated as 27 formed therein and a plurality of raised grout line forming edges each indicated as 28 extending upwardly therefrom. In production, the flexible block forming mold 22 is placed on a substantially rigid support platform 30.

Figure 6:
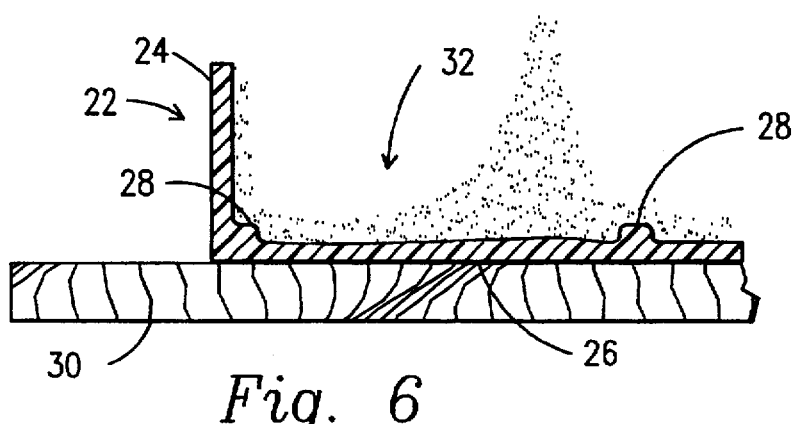

As shown in FIG. 6, a dry granular hydrophobic release agent 32 is applied to the interior of the flexible block forming mold to prevent the cementitious mortar or material from adhering to the flexible block forming mold 22. The dry granular hydrophobic release agent 32 may include an iron oxide pigment.

Figure 7:
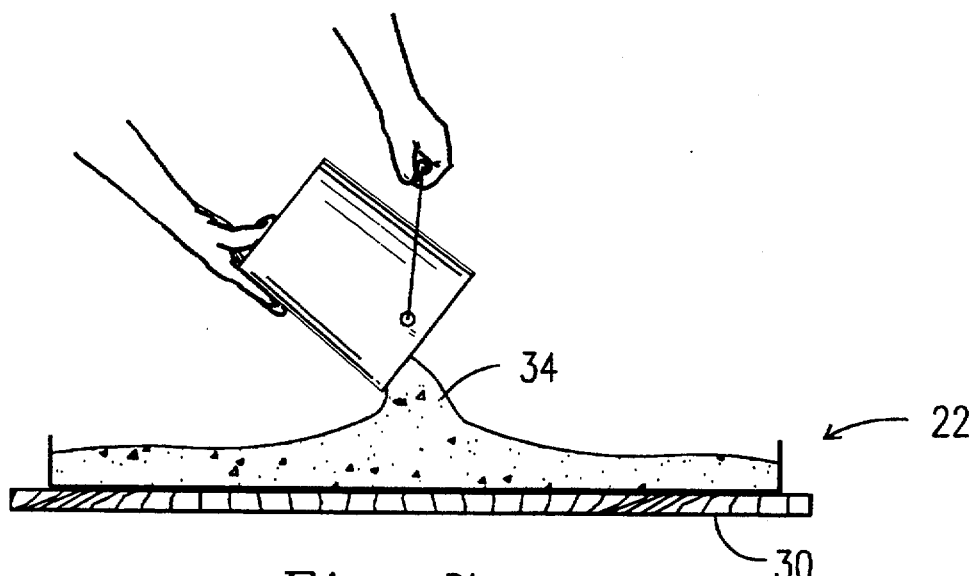
Figure 8:
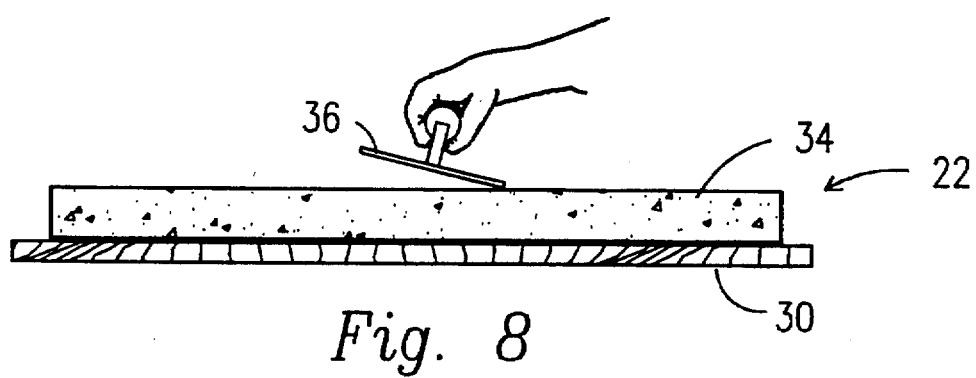

As shown in FIG. 7, the homogeneous cementitious mortar or material 34 is poured into the flexible block forming mold 22. The homogeneous cementitious mortar 34 is then leveled with a trowel 36 as shown in FIG. 8 or other suitable means.

Figure 9:
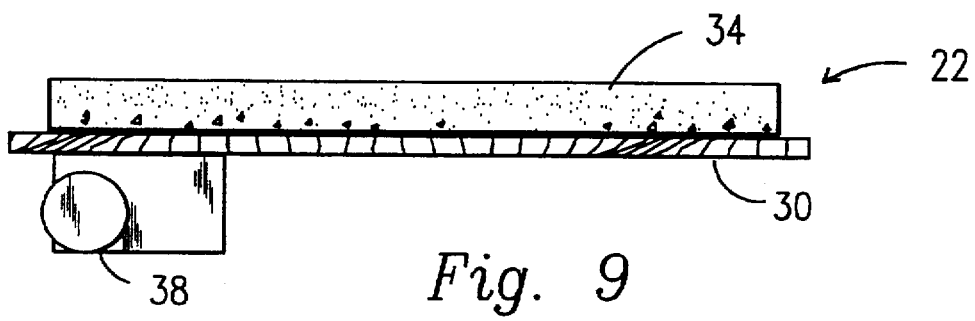

As shown in FIG. 9, the cementitious mortar or material 34 and flexible block forming mold 22 are vibrated on the substantially rigid support platform 30 by a vibrating device 38 for at least 15 seconds causing the fines or smaller sand and aggregate particles to migrate to the contoured or irregular bottom 26. The cementitious mortar or material 34 is then cured for approximately 24 hours forming the base 12 including the stratified layered upper surface 14 with the individual stone elements 15 and a plurality of grout lines 16 formed therein. The base 12 including the stratified layered upper surface 14 with the individual stone elements 15 and a plurality of grout lines 16 formed therein is then removed from the flexible block forming mold 22.

As shown in FIG. 10, an acid stain of muriatic acid and iron oxide pigment is applied to the stratified layered upper surface 14 of the base 12 with a brush 40 or other suitable means and allowed to set for 24 hours to shade the individual stone elements 15. In allowing the acid stain to etch into the upper decorative surface the pigment is allowed to diffuse into the upper decorative surface to create a secondary random irregular variegated pattern or random shaded areas therein.

As shown in FIG. 11, the upper irregular or stratified layered upper surface 14 is then washed with acid by the use of a nozzle 42 or other suitable means.

As shown in FIG. 12, the simulated grout lines 16 are accented with an antiquing or iron oxide pigment with a brush 44 or other suitable means.

Finally as shown in FIG. 13, the shaded and stratified layered upper surface 14 and simulated grout lines 16 are coated with the clear acrylic thermal plastic water resistant sealer 18 with a brush or roller 46 to protect the paving or patio block 10. Once the clear acrylic thermal plastic water resistant sealer 18 hardens, the replicated paving stone 10 is ready for traffic.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described what is claimed is:

1. A method for producing a replicated stone including a shaded irregular upper decorative surface comprising the following steps:
   (a) preparing a cementitious mortar;
   (b) applying a hydrophobic release agent including a pigment to an interior of a flexible block forming mold having a plurality of recesses to form a corresponding plurality of individual replicated stones before pouring the cementitious mortar into the flexible block forming mold to stain the cementitious mortar;
   (c) pouring the cementitious mortar into the flexible block forming mold;
   (d) vibrating the flexible block forming mold and cementitious mortar causing finer or smaller sand and aggregate particles to migrate to an irregular bottom to form a relatively nonporous upper decorative surface;
   (e) allowing the cementitious mortar to cure forming a replicated stone;
   (f) releasing the replicated stone from the flexible block forming mold;
   (g) applying an acid stain comprising an acid and pigment to the upper decorative surface;
   (h) allowing the acid stain to etch into the upper decorative surface causing the pigment to diffuse into the upper decorative surface to create a secondary random irregular variegated pattern therein;
   (i) sealing the upper decorative surface with a sealer.

2. The method of claim 1 further comprising the following step:
   (j) washing the upper decorative surface with an acid after etching.

3. The method of claim 2 wherein the flexible block forming mold includes a plurality of raised grout forming edges to form a plurality of simulated grout lines between the individual replicated stones further comprising the following step:
   (k) accenting the plurality of simulated grout lines with a pigment.

* * * * *